(12) United States Patent
Blanz et al.

(10) Patent No.: US 8,867,494 B2
(45) Date of Patent: Oct. 21, 2014

(54) SYSTEM AND METHOD FOR SINGLE FREQUENCY DUAL CELL HIGH SPEED DOWNLINK PACKET ACCESS

(75) Inventors: Josef J. Blanz, Forst (DE); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 12/941,781

(22) Filed: Nov. 8, 2010

(65) Prior Publication Data

US 2011/0110239 A1   May 12, 2011

Related U.S. Application Data

(60) Provisional application No. 61/259,510, filed on Nov. 9, 2009.

(51) Int. Cl.
| | |
|---|---|
| H04W 36/00 | (2009.01) |
| H04L 25/02 | (2006.01) |
| H04B 7/02 | (2006.01) |
| H04L 25/03 | (2006.01) |
| H04L 5/00 | (2006.01) |
| H04L 1/00 | (2006.01) |

(52) U.S. Cl.
CPC .............. *H04L 1/00* (2013.01); *H04L 25/0204* (2013.01); *H04B 7/024* (2013.01); *H04L 25/03343* (2013.01); *H04L 2025/03802* (2013.01); *H04L 5/001* (2013.01); *H04L 2025/03426* (2013.01); *H04L 5/0053* (2013.01); *H04L 5/0035* (2013.01); *H04L 5/0032* (2013.01); *H04B 7/022* (2013.01); *H04L 5/0073* (2013.01)
USPC .......................................... 370/332; 455/436

(58) Field of Classification Search
None
See application file for complete search history.

(56) References Cited

U.S. PATENT DOCUMENTS

| 8,331,377 B2 | 12/2012 | Attar et al. |
| 8,477,734 B2 | 7/2013 | Sambhwani et al. |

(Continued)

FOREIGN PATENT DOCUMENTS

| CN | 1301471 A | 6/2001 |
| CN | 1969475 A | 5/2007 |

(Continued)

OTHER PUBLICATIONS

3GPP: "3rd Generation Partnership Project;Technical Specification Group TSG name;verview of 3GPP Release 8; Summary of all Release 8 Features (Release 8)", 3GPP Draft; REL-8_Description 20080807, 3rd Generation Partnership Project (3GPP), Mobile Competence Centre; 650, Route Des Lucioles; F-06921 Sophia-Antipolis Cedex ; France, no. Budapest; 20080808, Aug. 8, 2008, XP050314419, [retrieved on Aug. 8, 2008].

(Continued)

*Primary Examiner* — Jianye Wu
(74) *Attorney, Agent, or Firm* — Darren M. Simon

(57) ABSTRACT

A system and method provide single frequency, dual cell high-speed downlink packet access to a UMTS telecommunications system. A first downlink channel is provided from a first sector, and a second downlink channel is provided from a second sector, wherein the first downlink channel and the second downlink channel are in substantially the same carrier frequency. Feedback information such as a CQI and/or a PCI is provided on an uplink channel to facilitate adaptation of the respective downlink channels. Here, the uplink carrier may be in the same or a different carrier frequency than that of the downlink channels.

24 Claims, 6 Drawing Sheets

(56) References Cited

U.S. PATENT DOCUMENTS

| | | | |
|---|---|---|---|
| 2004/0116122 A1* | 6/2004 | Zeira et al. | 455/445 |
| 2004/0166886 A1* | 8/2004 | Laroia et al. | 455/522 |
| 2006/0007889 A1* | 1/2006 | Khan | 370/331 |
| 2006/0068791 A1 | 3/2006 | Lindoff | |
| 2008/0057934 A1 | 3/2008 | Sung et al. | |
| 2008/0068996 A1* | 3/2008 | Clave et al. | 370/230.1 |
| 2008/0085708 A1 | 4/2008 | Kogure | |
| 2009/0129401 A1 | 5/2009 | Kang et al. | |

FOREIGN PATENT DOCUMENTS

| | | |
|---|---|---|
| CN | 101159462 A | 4/2008 |
| EP | 1895795 A2 | 3/2008 |
| EP | 1901568 A1 | 3/2008 |
| JP | 2008061250 A | 3/2008 |
| JP | 2008098847 A | 4/2008 |
| JP | 2008515254 A | 5/2008 |
| JP | 2009124668 A | 6/2009 |
| KR | 20050000202 A | 1/2005 |
| WO | 2007004628 A1 | 1/2007 |
| WO | 2007035048 A2 | 3/2007 |
| WO | 2007091482 A1 | 8/2007 |
| WO | 2009117673 A1 | 9/2009 |

OTHER PUBLICATIONS

3rd Generation Partnership Project;Technical Specification Group Radio Access Network;Physical layer procedures (FDD)(Release 9), 3GPP Draft; Draft 25214-900, 3rd Generation Partnership Project (3GPP), Mobile Competence Centre ; 650, Route Des Lucioles ; F-06921 Sophia-Antipolis Cedex ; France, Sep. 1, 2009, XP050388074, [retrieved on Sep. 22, 2009].

Akhtar S, et al., "CIR Based Soft Handover for UTRA FDD Uplink", Personal, Indoor and Mobile Radio Communications, 2000. PIMRC 2000. The 11th IEEE International Symposium on Sep. 18-21, 2000, Piscataway, NJ, USA,IEEE, vol. 1, Sep. 18, 2000.

Chang J., et al., "A Fractional Soft Handover Scheme for 3GPP LTE-Advanced System", Communications Workshops, 2009. ICC Workshops 2009. IEEE International Conference on, IEEE, Piscataway, NJ, USA, Jun. 14, 2009, pp. 1-5, XP031515459, ISBN: 978-1-4244-3437-4.

Da Silva M et al: "W-CDMA Uplink Soft Handover Gain Measurements", 2005 IEEE 61st Vehicular Technology Conference. VTC2005—Spring—May 30-Jun. 1, 2005—Stockholm, Sweden, IEEE, Piscataway, NJ, USA, vol. 1, May 30, 2005, pp. 416-418, XP010855426, DOI: DOI:10.1109/VETECS.2005.1543323 ISBN: 978-0-7803-8887-1.

International Search Report and Written Opinion—PCT/US2010/056080—ISA/EPO—May 3, 2011.

Jamalipour A et al: "A tutorial on multiple access technologies for beyond 3G mobile networks", IEEE Communications Magazine, IEEE Service Center, Piscataway, US, vol. 43, No. 2, Feb. 1, 2005, pp. 110-117, ISSN: 01 63-6804, DOI: 10.1109/MCOM. 2005.1391509.

Letian Rong et al: "Analytical Analysis of the Coverage of a MBSFN OFDMA Network", Global Telecommunications Conference, 2008. IEEE Globecom 2008. IEEE, IEEE, Piscataway, NJ, USA, Nov. 30, 2008, pp. 1-5, XP031370142, ISBN: 978-1-4244-2324-8.

Qualcomm Incorporated: "On deploying DC-HSDPA UEs in Single Frequency Networks", R1-104157, 3rd Generation Partnership Project (3GPP), Mobile Competence Centre ; 650, Route Des Lucioles ; F-06921 Sophia-Antipolis Cedex ; France, vol . RAN-WG1, no. Dresden, Germany; 20100629 Jul. 5, 2010, XP002633072, Retrieved from the Internet: URL:http://www.3gpp.org/ftp/tsg_ran/WG1_RL 1/TSGR1_61b/Docs/R1-104157.zip [retrieved on Apr. 14, 2011] .

R.M. Joyce: "Soft handover gain measurements and optimisation of a WCDMA network", Fifth IEEE International Conference on 3G Mobile Communication Technologies (3G 2004) the Premier Technical Conference for 3G and Beyond, vol. 2004, Jan. 1, 2004 , pp. 659-663, DOI: 10.1049/cp:20040758.

Taiwan Search Report—TW099138559—TIPO—Aug. 19, 2013.

* cited by examiner

SYSTEM AND METHOD FOR SINGLE FREQUENCY DUAL CELL HIGH SPEED DOWNLINK PACKET ACCESS

CROSS-REFERENCE TO RELATED APPLICATION(S)

This application claims the benefit of U.S. Provisional Patent Application No. 61/259,510, entitled "System and Method for Single Frequency Dual Cell High Speed Downlink Packet Access," filed on Nov. 9, 2009, which is expressly incorporated by reference herein in its entirety.

BACKGROUND

1. Field

Aspects of the present disclosure relate generally to wireless communication systems, and more particularly, to DC-HSDPA UMTS systems.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

A system and method provide single frequency, dual cell high-speed downlink packet access to a UMTS telecommunications system. A first downlink channel is provided from a first sector, and a second downlink channel is provided from a second sector, wherein the first downlink channel and the second downlink channel are in substantially the same carrier frequency. Feedback information such as a CQI and/or a PCI is provided on an uplink carrier to facilitate adaptation of the respective downlink channels. Here, the uplink carrier may be in the same or a different carrier frequency than that of the downlink channels.

In one aspect, the disclosure provides a method for communication in a wireless network. Here, the method may include providing information on a first downlink channel from a first sector, and information on a second downlink channel from a second sector, wherein the first downlink channel and the second downlink channel are in substantially the same carrier frequency. The method may further include receiving feedback information corresponding to the downlink channel state for the first downlink channel at the first sector and receiving feedback information corresponding to the downlink channel state for the second downlink channel at the second sector.

Another aspect of the disclosure provides a computer program product including a computer-readable medium having code for providing information on a first downlink channel from a first sector, and information on a second downlink channel from a second sector, wherein the first downlink channel and the second downlink channel are in substantially the same carrier frequency. The computer-readable medium may further have code for receiving feedback information corresponding to the downlink channel state for the first downlink channel at the first sector and code for receiving feedback information corresponding to the downlink channel state for the second downlink channel at the second sector.

Yet another aspect of the disclosure provides an apparatus for high speed downlink packet access including at least one processor and a memory coupled to the at least one processor. Here, the at least one processor may be configured to provide information on a first downlink channel from a first sector, and information on a second downlink channel from a second sector, wherein the first downlink channel and the second downlink channel are in substantially the same carrier frequency. The at least one processor may be further configured to receive feedback information corresponding to the downlink channel state for the first downlink channel at the first sector and receive feedback information corresponding to the downlink channel state for the second downlink channel at the second sector.

Still another aspect of the disclosure provides an apparatus operable in a wireless communication system, the apparatus including means for providing information on a first downlink channel from a first sector, and information on a second downlink channel from a second sector, wherein the first downlink channel and the second downlink channel are in substantially the same carrier frequency. The apparatus may further include means for receiving feedback information corresponding to the downlink channel state for the first downlink channel at the first sector and means for receiving feedback information corresponding to the downlink channel state for the second downlink channel at the second sector. These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
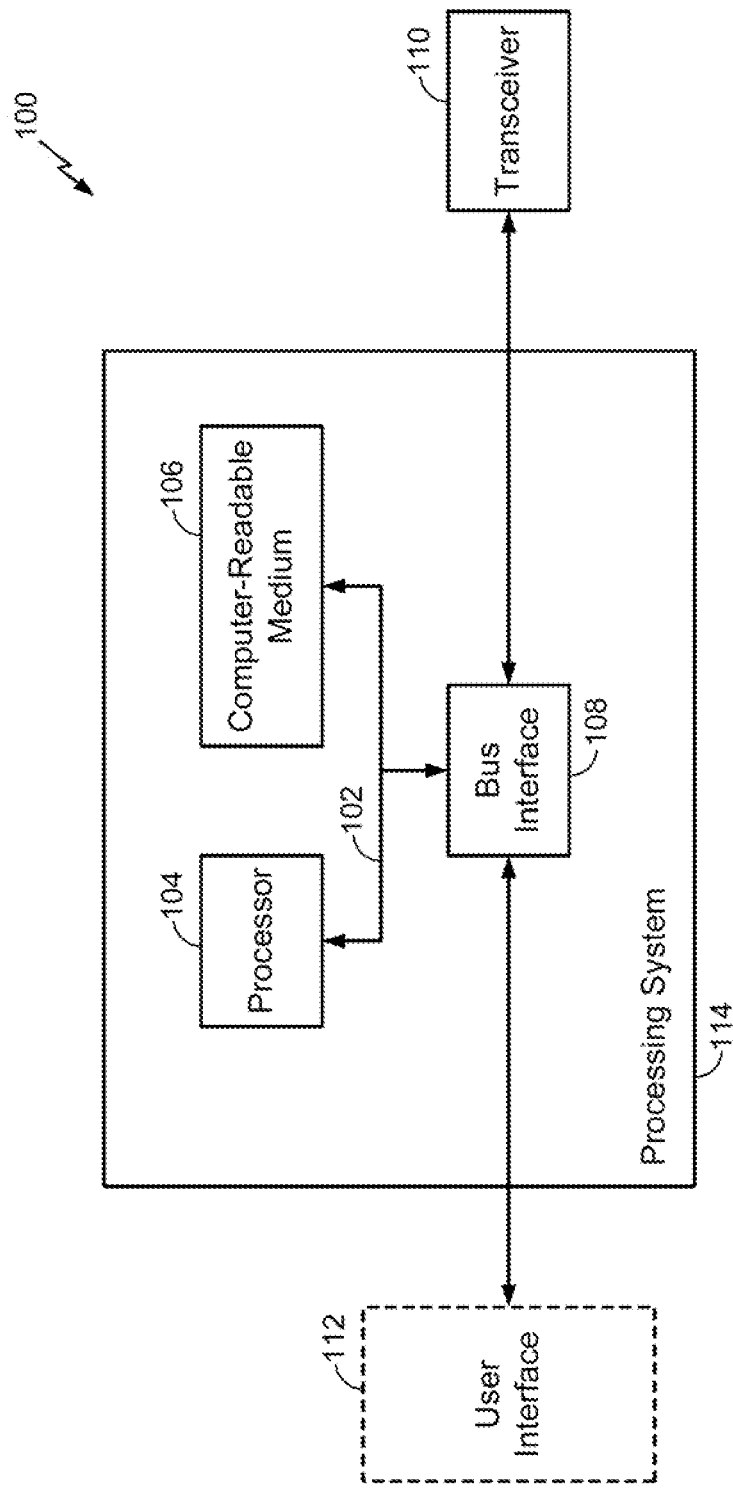
FIG. 1 is a diagram illustrating an example of a hardware implementation for an apparatus employing a processing system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
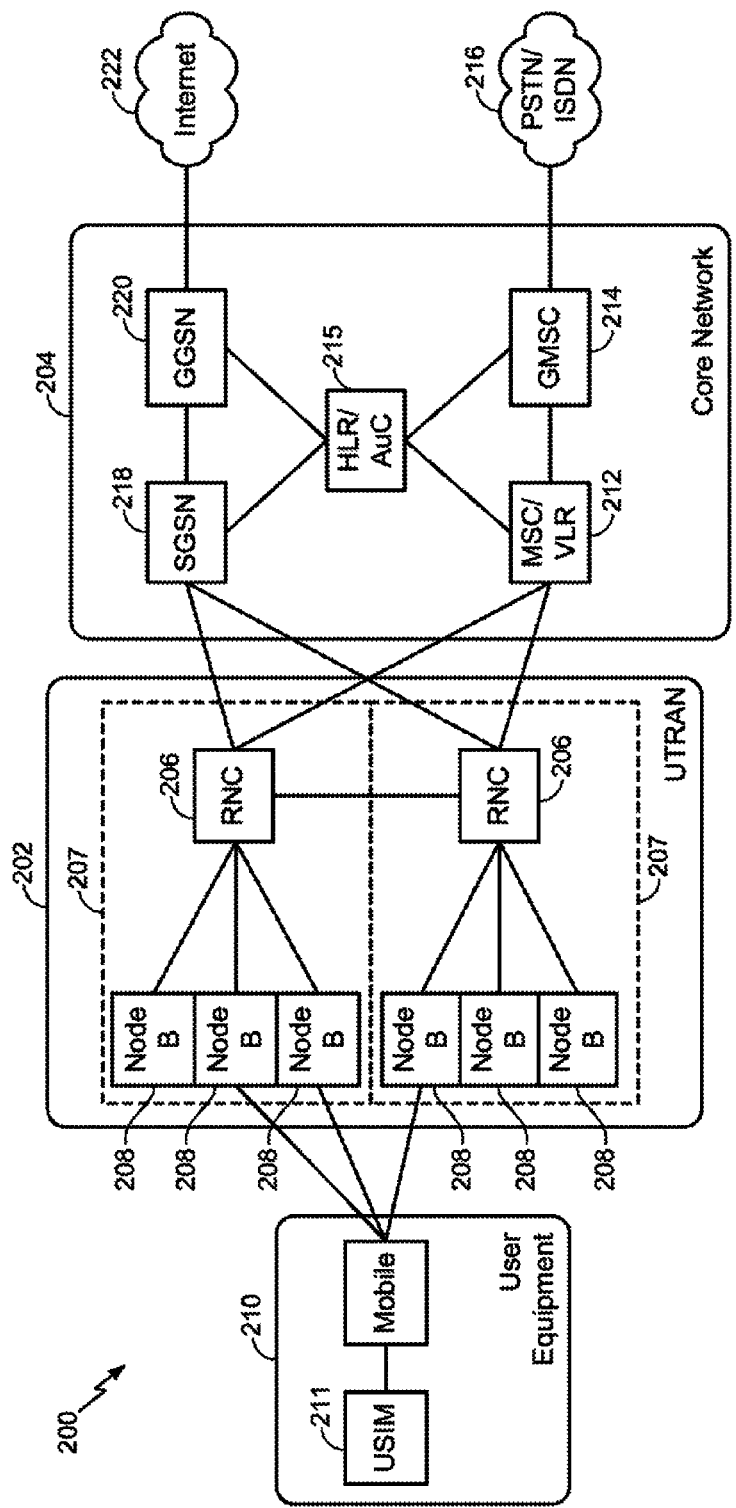
FIG. 2 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 2 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in RRC Protocol Specification, 3GPP TS 25.331 v9.1.0, incorporated herein by reference.

The geographic region covered by the SRNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each SRNS 207; however, the SRNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as UE in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The core network 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 3:
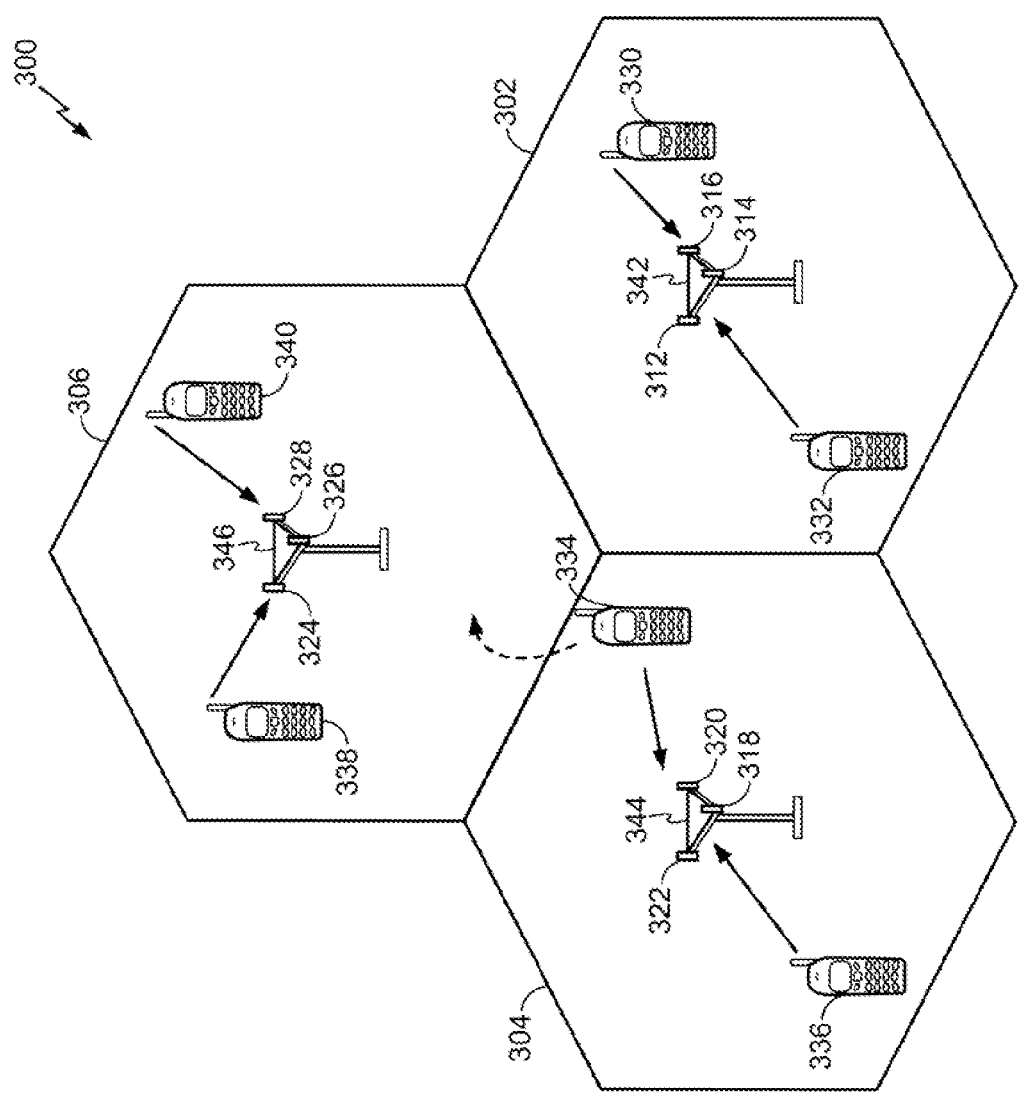
FIG. 3 is a conceptual diagram illustrating an example of an access network.

Referring to FIG. 3, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a core network 204 (see FIG. 2) for all the UEs 330, 332, 334, 336, 338, 340 in the respective cells 302, 304, and 306.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 2), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 4:
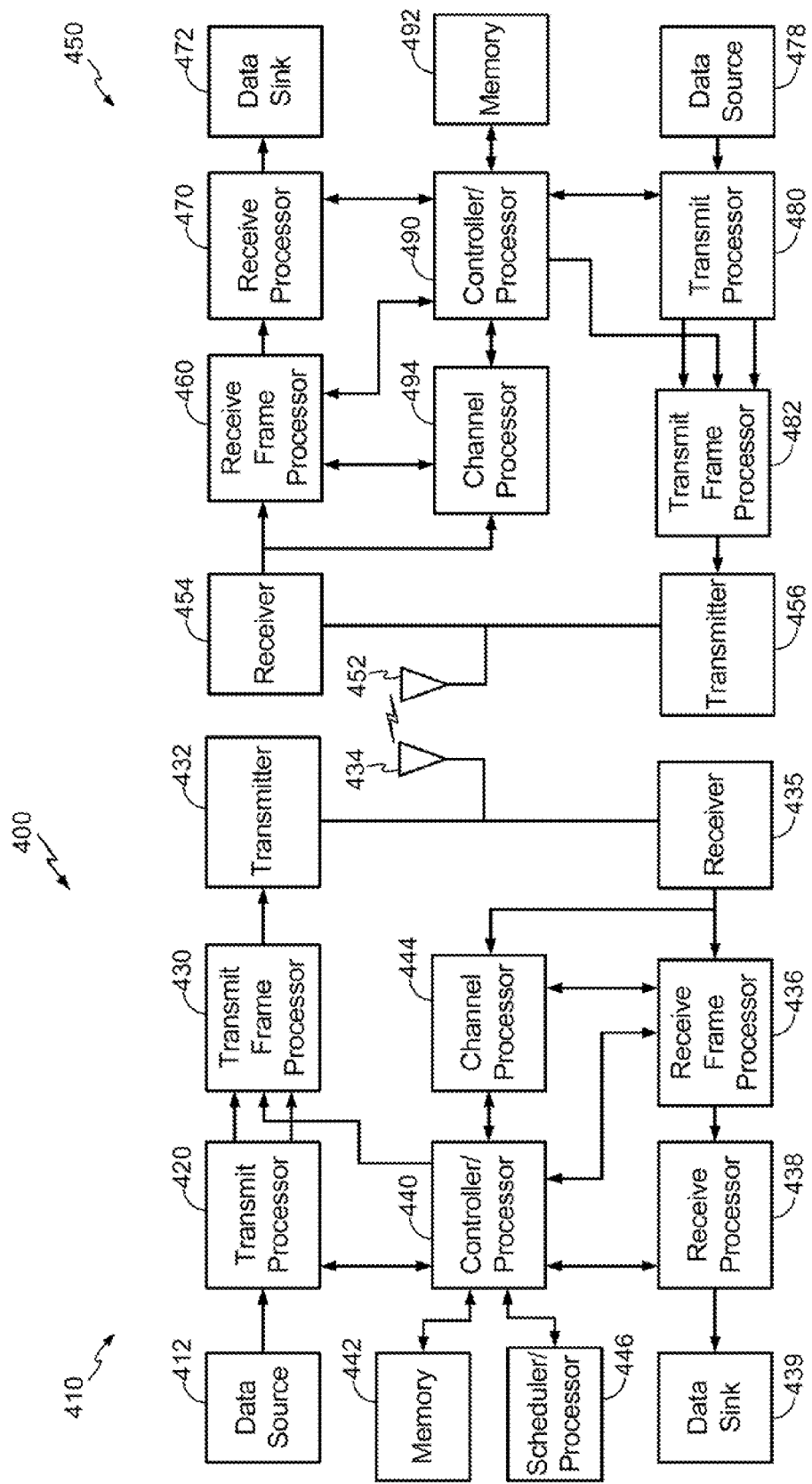
FIG. 4 is a block diagram conceptually illustrating an example of a Node B in communication with a UE in a telecommunications system.

FIG. 4 is a block diagram of a Node B 410 in communication with a UE 450, where the Node B 410 may be the Node B 208 in FIG. 2, and the UE 450 may be the UE 210 in FIG. 2. In the downlink communication, a transmit processor 420 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback from the UE 450. The symbols generated by the transmit processor 420 are provided to a transmit frame processor 430 to create a frame structure. The transmit frame processor 430 creates this frame structure by multiplexing the symbols with information from the controller/processor 440, resulting in a series of frames.

The frames are then provided to a transmitter 432, which provides various signal conditioning functions including amplifying, filtering, and modulating the frames onto a carrier for downlink transmission over the wireless medium through antenna 434. The antenna 434 may include one or more antennas, for example, including beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 460, which parses each frame, and provides information from the frames to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback provided by the Node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with information from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides information from the frames to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may also use an ACK and/or NACK protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the Node B 410 and the UE 450, respectively. A scheduler/processor 446 at the Node B 410 may be used to allocate resources to the UEs and schedule downlink and/or uplink transmissions for the UEs.

High-speed downlink packet access (HSDPA) is a 3G communications protocol defined in the 3GPP family of standards as an early enhancement to the UMTS downlink. In HSDPA, a transport channel called the high-speed downlink shared channel (HS-DSCH) is utilized. Here, the HS-DSCH is mapped to physical channels including the high-speed shared control channel (HS-SCCH), the high-speed dedicated physical control channel (HS-DPCCH), and the high-speed physical downlink shared channel (HS-PDSCH). While the HS-PDSCH carries the actual data on the downlink, the HS-SCCH is a downlink control channel used to provide control information to the UE about the information on the corresponding HS-PDSCH. The HS-DPCCH is an uplink channel that provides feedback information to the Node B such as a channel quality indicator (CQI), a precoding control indicator (PCI), and/or a hybrid automatic repeat request (HARQ) acknowledgment or non-acknowledgment (ACK/NACK). In general, the feedback information provides information to the Node B corresponding to the downlink channel state of the downlink channel provided by the Node B. In this way, the Node B may adapt transmissions on the downlink channel in accordance with the feedback information corresponding to the downlink channel state.

Dual cell or dual channel HSDPA (DC-HSDPA) is a further enhancement to HSDPA that utilizes carrier aggregation on the downlink. That is, in DC-HSDPA, a Node B may provide two HS-DSCH channels on two carrier frequencies to a UE in order essentially to double the downlink throughput. As specified, DC-HSDPA provides the two HS-DSCH channels to a UE from a single sector, such that the scheduling of resources to that UE is consolidated into the single sector.

When a UE 334 (see FIG. 3) is using HSDPA service at the boundary of two neighboring sectors, the throughput of this service is often limited due to inter-sector interference or low signal quality from the serving sector. Due to interference from a neighboring sector and/or due to a weak signal from the serving sector the terminal might only get served with a very limited data rate. Thus, in a DC-HSDPA system, when the quality of one or both HS-DSCH channels degrades, the sector may simply hand over to another sector, which may then provide the dual cells to the UE.

Figure 5:
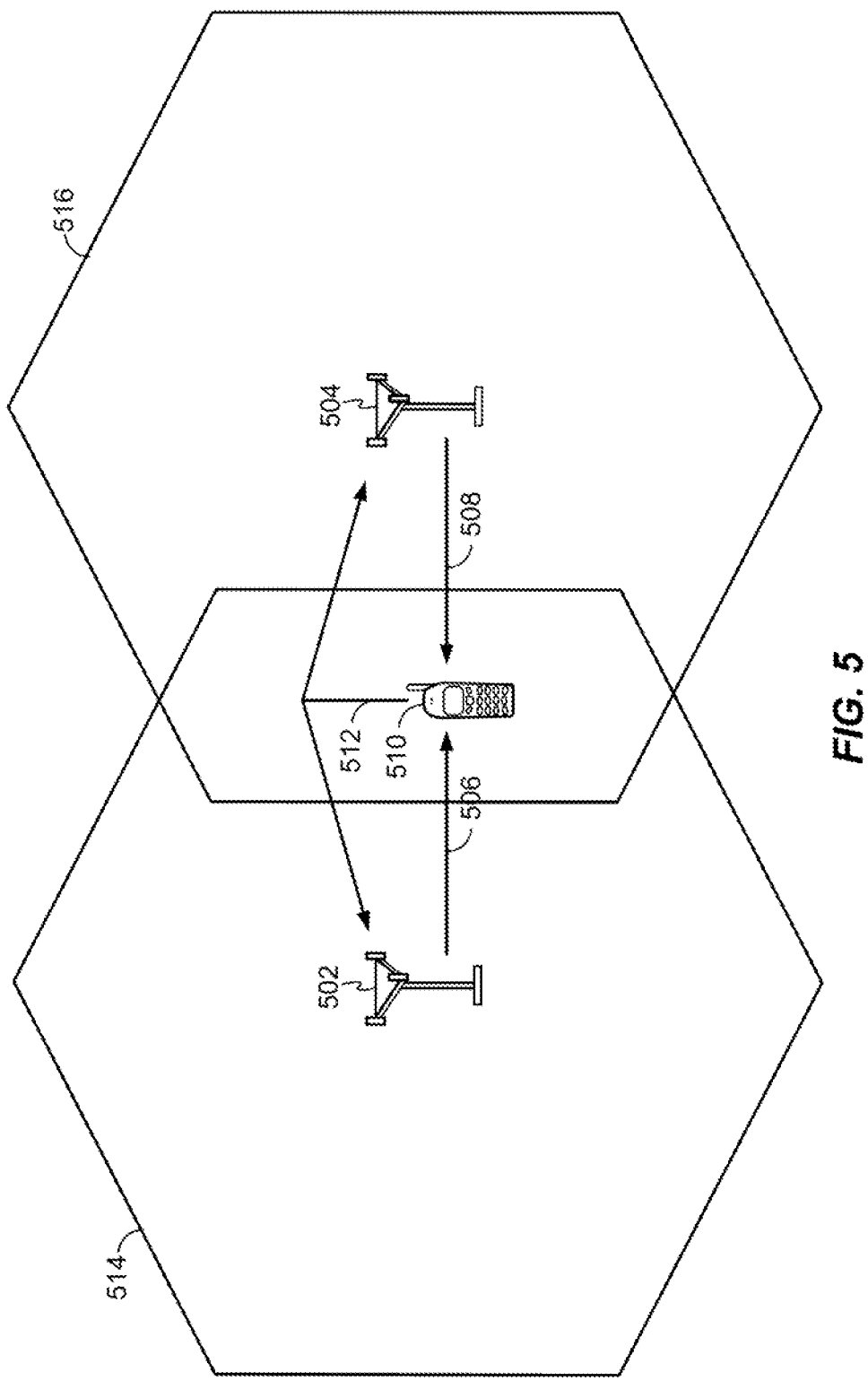
FIG. 5 is a conceptual diagram illustrating a SFDC-HSDPA system in accordance with an exemplary aspect of the disclosure.

In an aspect of the instant disclosure, as illustrated in FIG. 5, it may be beneficial to have a geographic overlap between two or more sectors 514 and 516, such that a UE 510 may be served, at least for a certain period of time, by the multiple sectors. Thus, a wireless telecommunications system in accordance with the present disclosure may provide HSDPA service from a plurality of sectors on a single frequency channel. For example, a setup utilizing two sectors may be referred to as Single Frequency Dual Cell HSDPA (SFDC-HSDPA). However, other terminology may be freely utilized. In this way, users at sector boundaries, as well as the overall system, may benefit from a high throughput. Here, the different sectors may be provided by the same Node B, or the different sectors may be provided by different Node Bs.

FIG. 5 is a conceptual diagram illustrating a SFDC-HSDPA system in accordance with an exemplary aspect of the disclosure. In the scheme illustrated in FIG. 5, two Node Bs 502 and 504 each provide a downlink channel 506 and 508, respectively, wherein the downlink channels are in substantially the same carrier frequency. Of course, as already described, in another aspect, both downlink carriers 506 and 508 may be provided from different sectors of the same Node B. Here, the UE 510 receives the downlink channels and provides an uplink channel 512, which is received by both Node Bs 502 and 504. The uplink channel 512 from the UE 510 may provide feedback information, e.g., corresponding to the downlink channel state for the corresponding downlink channels 506 and 508.

In an aspect of the instant disclosure, the feedback information, such as the CQI and PCI, including channel state information for each of the sectors, may be periodically transmitted on a single uplink channel 512 (e.g., the HS-DPCCH) by the UE 510 to each Node B (e.g., to one Node B when it corresponds to each of the sectors, or to a plurality of Node Bs when the sectors are provided by different respective Node Bs) in order to allow the one or more Node B schedulers to determine the channel state of downlink channels 506, 508 provided by two different sectors on the same carrier frequency. That is, the uplink signal 512 including the feedback information from the UE may be received by both sectors (e.g., at Node Bs 502 and 504) in a manner similar in some ways to a soft handover. Here, the feedback information corresponding to the different downlink channels may be time multiplexed or code multiplexed. For example, when the feedback information is code multiplexed, the feedback information may be modulated with, e.g., UE specific channelization codes corresponding to the respective sectors. Thus, the feedback signals in the uplink (e.g., on the HS-DPCCH) received by each of the sectors may be soft combined at the Node B receiver, increasing the reliability of the uplink reports.

When the feedback information corresponding to the plurality of downlink channels 506, 508 is code multiplexed, different channelization codes may be utilized for the feedback corresponding to the downlink channel the feedback information relates to. Thus, the feedback may be provided for a plurality of downlink channels on the same uplink frequency channel. Here, in an exemplary aspect of the disclosure, the channelization codes utilized for the feedback information may be symbol-aligned so as to reduce interference between the different feedback symbols. That is, in order for the feedback symbols to be substantially orthogonal to one another when utilizing multi-code transmissions, the channelization codes may be symbol-aligned. In other aspects, the scrambling codes may not be synchronous with one another. That is, synchronization or alignment among a plurality of channelization codes is not necessary for various implementations. However, the synchronization may reduce interference and processing resources utilized for receiving the feedback information. In this way, any ambiguity in the matching of ACK/NACK reports in the uplink with the corresponding data packets transmitted in the downlink may be reduced or avoided. Also, for the CQI reporting on the uplink HS-DPCCH, various aspects of the instant disclosure utilize sub-frame synchronization.

In another aspect of the disclosure, feedback on a single uplink carrier corresponding to a plurality of downlink channels may be jointly encoded, utilizing a codebook to select a suitable channelization code that encodes the desired feedback for each of the downlink channels. That is, a single feedback symbol selected from a codebook can be utilized as a channelization code for encoding HARQ ACK/NACK feedback for a plurality of downlink channels.

A further aspect of the disclosure provides for sub-frame synchronization of HS-PDSCHs on downlink transmissions. Although beneficial, synchronization of HS-PDSCH channels at a sub-frame level is not obligatory. That is, there are alternative methods to implement SFDC-HSDPA without sub-frame synchronization of HS-PDSCHs. However, without sub-frame synchronization, certain issues may arise. For example, matching between joint ACK/NACK reports on HS-DPCCH and asynchronous HS-PDSCH TTIs may require additional processing. Further, more HARQ instances may be needed due to a longer delay between the transmission of the HS-PDSCH and the ACK/NACK feedback on the HS-DPCCH. Still further, different offsets may occur between CQI reports on the HS-DPCCH and the respective HS-PDSCH TTIs for the two sectors.

In another aspect of the disclosure, the feedback information need not necessarily be provided on a single uplink carrier frequency. That is, although the utilization of a single uplink carrier frequency may reduce the expense, as it may only require a single transmitter and antenna, some implementations may utilize a plurality of uplink carrier frequencies. For example, referring again to FIG. 4, in one example the UE 450 may include more than one transmitter 456, transmit frame processor 482, and or transmit processor 480, as well as more than one antenna 452. In one example, then, a UE receiving SFDC-HSDPA may provide feedback for the two downlink channels 506 and 508 on two different uplink carrier frequencies. That is, one of the uplink carrier frequencies may correspond to one of the sectors providing a downlink transmission, while the second uplink carrier frequency may correspond to the second sector providing a downlink transmission. Here, there is less of a motivation for any scrambling codes used for the corresponding feedback symbols to be symbol-aligned, because the symbols are already orthogonal by virtue of their being transmitted on different carrier frequencies. Those skilled in the art will realize that such a one-to-one correspondence is only give here as an example, and many other suitable implementations such as each of the uplink frequency channels corresponding to both of the downlink transmissions at different times, etc.

In one aspect of the control channel signaling for a SFDC-HSDPA system, from each sector providing a downlink channel, the UE may receive scheduling information—when the UE gets scheduled—on one or more HS-SCCH per sector. In another aspect of the instant disclosure, one or more HS-SCCH may be utilized on a sector considered to be a master sector, to provide control information corresponding to scheduled data from both sectors.

Also, with respect to the HS-PDSCH transmission, synchronization of frames between sectors may be utilized. In this way, when the UE is scheduled on both sectors simultaneously, it may apply inter-HS-PDSCH interference cancellation (also referred to as intercell interference cancellation), as known to those skilled in the art, further improving the throughput for these sector-boundary users and the overall system throughput. Those skilled in the art will be familiar with the concept of inter-HS-PDSCH interference cancellation, which may be utilized to reduce interference from neighboring sectors. That is, because transmissions from different sectors, which generally utilize different spreading codes, are non-orthogonal, the signal from one sector may look similar to noise when listening for a signal from another sector. However, the signal is in fact not merely noise, and a receiver such as a UE may have information concerning that signal such as the spreading codes being utilized, etc. Thus, the receiver may utilize inner-HS-PDSCH interference cancellation to reduce the interference from the other sector. Further, the UE may take improvements from the inter-sector interference cancellation into account when determining the resulting feedback (e.g., CQI) related to the channel state. That is, the channel quality reflected in the CQI provided on an uplink transmission may depend on inter-HS-PDSCH interference cancellation.

Thus, a primary and secondary sector may be defined in a dynamic way. That is, the feedback information on the respective HS-DPCCH for the primary sector may be such that this feedback is accurate even if no interference cancellation is possible (e.g., when the UE is only scheduled on a single sector). Of course, the feedback information corresponding to the secondary sector may only be accurate if the UE is actually scheduled on both sectors. Still, further optimization of the control channel signaling may enable an efficient use of interference cancellation techniques without penalizing conventional linear receivers.

Those skilled in the art will comprehend that certain aspects of SFDC-HSDPA may be similar to a soft-handover. That is, a user may receive downlink information from dual sectors substantially simultaneously, increasing both throughput and reliability, while certain uplink transmissions are provided to each of the dual sectors. Thus, for example, when a user is at a boundary of two sectors, the expected poor performance resulting, for example, from inter-sector interference, may be reduced or avoided. That is, if a user is served by a first sector, and if a second sector improves, the serving sector may be changed such that the user may be served by the better suited sector. E.g., at a certain geographic location where the areas corresponding to two sectors overlap or touch each other, it may be difficult to determine which sector is better, and further, the designation of which sector is better may rapidly change over time at a border. Thus, it may be useful to transfer data from both sectors simultaneously. In this way a user may be better served at the boundary area.

Figure 6:
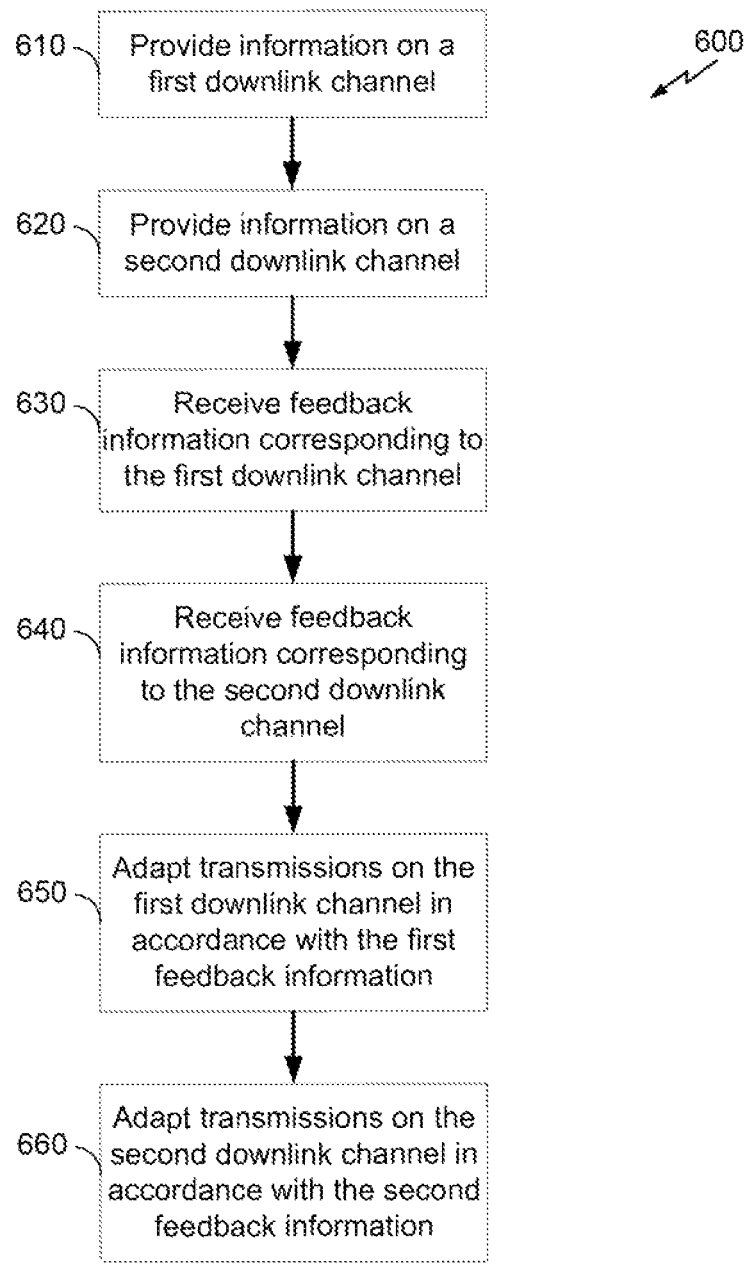
FIG. 6 is a flow chart illustrating a process of communicating in a SFDC-HSDPA wireless network in accordance with an exemplary aspect of the disclosure.

FIG. 6 is a flow chart illustrating a process 600 of utilizing SFDC-HSDPA in accordance with an exemplary aspect of the present disclosure. In the exemplary process, in block 610 information is provided on a first downlink channel from a first sector, and in block 620 information is provided on a second downlink channel from a second sector. Here, the first downlink channel and the second downlink channel may be in substantially the same carrier frequency. In one example, as illustrated in FIG. 4, each downlink channel may be provided by a respective Node B 410, and transmitted by the transmitter 432, under the influence of the transmit frame processor 430, transmit processor 420, and controller/processor 440. As discussed above, the respective downlink channels may be provided by plural sectors in a single Node B 410, or by separate Node Bs.

In block 630, feedback information is received at the first sector corresponding to the downlink channel state for the first downlink channel, and in block 640, feedback information is received at the second sector corresponding to the downlink channel state for the second downlink channel. In one example, as illustrated in FIG. 4, the feedback information may be received by the receiver 435, and the information sent to and processed by one or more of the receive frame processor 436, the receive processor 438, the channel processor 444, and/or the controller/processor 440. In block 650, the transmissions on the first downlink channel are adapted in accordance with the feedback information corresponding to the downlink channel state for the first downlink channel, and in block 660, the transmissions on the second downlink channel are adapted in accordance with the feedback information corresponding to the downlink channel state for the second downlink channel. Returning once again to FIG. 4, the controller/processor 440 may function in accordance with the feedback information received to adapt the transmissions in conjunction with one or more of the transmit processor 420, the transmit frame processor 430, and/or the transmitter 432.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "mean's for" or, in the case of a method claim, the element is recited using the phrase "step for."

The invention claimed is:

1. A method for communication in a wireless network, comprising:
   providing first information on a first downlink channel from a first sector, and second information on a second downlink channel from a second sector, wherein the first downlink channel and the second downlink channel are each carried on a first carrier frequency;
   receiving first feedback information corresponding to a first downlink channel state for the first downlink channel at the first sector; and
   receiving second feedback information corresponding to a second downlink channel state for the second downlink channel at the second sector, wherein the feedback information is jointly encoded with the second feedback information using a channelization code, and is received on an uplink channel on a first uplink carrier frequency.

2. The method of claim 1, wherein the uplink channel is a high speed dedicated physical control channel.

3. The method of claim 1, wherein the first feedback information and the second feedback information correspond at least one of a CQI or a PCI.

4. The method of claim 1, further comprising:
   adapting transmissions on the first downlink channel in accordance with the first feedback information; and
   adapting transmissions on the second downlink channel in accordance with the second feedback information.

5. The method of claim 2, wherein a first sub-frame timing of the high speed dedicated physical control channel in the first sector is substantially asynchronous to a second sub-frame timing of the high speed dedicated physical control channel in the second sector.

6. The method of claim 1, further comprising receiving scheduling information on one or more downlink channels corresponding to each of the first and second sectors.

7. The method of claim 6, wherein the receiving of the scheduling information comprises receiving the scheduling information on the first downlink channel, wherein the first sector is a master sector that provides the scheduling information for the master sector and at least one other sector.

8. The method of claim 1, wherein interference from the first sector is reduced when listening for the second downlink channel from the second sector by applying intercell interference cancellation.

9. An apparatus for high speed downlink packet access, comprising:
   at least one processor; and
   a memory coupled to the at least one processor,
   wherein the at least one processor is configured to:
      provide first information on a first downlink channel from a first sector, and second information on a second downlink channel from a second sector, wherein the first downlink channel and the second downlink channel are carried on a first carrier frequency;
      receive first feedback information corresponding to a first downlink channel state for the first downlink channel at the first sector; and
      receive second feedback information corresponding to a second downlink channel state for the second downlink channel at the second sector, wherein the first feedback information is jointly encoded with the second feedback information using a channelization code, and is received on an uplink channel on a first uplink carrier frequency.

10. The apparatus of claim 9, wherein the uplink channel is a high speed dedicated physical control channel.

11. The apparatus of claim 9, wherein the first feedback information and the second feedback information correspond to at least one of a CQI or a PCI.

12. The apparatus of claim 9, wherein the at least one processor is further configured to:
   adapt transmissions on the first downlink channel in accordance with the first feedback information; and
   adapt transmissions on the second downlink channel in accordance with the second feedback information.

13. The apparatus of claim 9, wherein a first sub-frame timing of the high speed dedicated physical control channel in the first sector is substantially asynchronous to a second sub-frame timing of the high speed dedicated physical control channel in the second sector.

14. The apparatus of claim 9, wherein the at least one processor is further configured to receive scheduling information on one or more downlink channels corresponding to each of the first and second sectors.

15. The apparatus of claim 14, wherein the receiving of the scheduling information comprises receiving the scheduling information on the first downlink channel, wherein the first sector is a master sector that provides the scheduling information for the master sector and at least one other sector.

16. The apparatus of claim 9, wherein interference from the first sector is reduced when listening for the second downlink channel from the second sector by applying intercell interference cancellation.

17. A method for communication in a wireless network, comprising:
   receiving first information on a first downlink channel from a first sector, and second information on a second downlink channel from a second sector, on a first downlink carrier frequency;
   jointly encoding first feedback information corresponding to a first downlink channel state for the first downlink channel at the first sector with second feedback information corresponding to a second downlink channel state for the second downlink channel at the second sector using a channelization code; and
   transmitting the jointly encoded first and second feedback information on an uplink channel over a first uplink carrier frequency.

18. The method of claim 17, wherein the uplink channel is a high speed physical control channel allocated by the first sector or the second sector.

19. The method of claim 17, wherein the first feedback information and the second feedback information correspond to at least one of a CQI or a PCI.

20. The method of claim 17, wherein a sub-frame timing of the high speed dedicated physical control channel in the first sector is substantially asynchronous to a second sub-frame timing of the high speed dedicated physical control channel in the second sector.

21. An apparatus for communication in a wireless network, comprising:
   at least one processor; and
   a memory coupled to the at least one processor,
   wherein the at least one processor is configured to:
      receive first information on a first downlink channel from a first sector, and second information on a second downlink channel from a second sector on a first downlink carrier frequency;
      jointly encode first feedback information corresponding to a first downlink channel state for the first downlink channel at the first sector with second feedback information corresponding to a second downlink channel state for the second downlink channel at the second sector using a channelization code; and
      transmit the jointly encoded first and second feedback information on an uplink channel over a first uplink carrier frequency.

22. The apparatus of claim 21, wherein the uplink channel is a high speed physical control channel allocated by the first sector or the second sector.

23. The apparatus of claim 21, wherein the first feedback information and the second feedback information correspond to at least one of a CQI or a PCI.

24. The apparatus of claim 21, wherein a sub-frame timing of the high speed dedicated physical control channel in the first sector is substantially asynchronous to a second sub-frame timing of the high speed dedicated physical control channel in the second sector.

* * * * *